United States Patent [19]

Gruber et al.

[11] 3,830,981

[45] Aug. 20, 1974

[54] PULSE STUFFING CONTROL CIRCUIT FOR REDUCING JITTER IN TDM SYSTEM

[75] Inventors: John Gerald Gruber; Peter El Kwan Chow; Joseph Winston Houghton, all of Ottawa, Ontario, Canada

[73] Assignee: Bell-Northern Research Ltd., Ottawa, Ontario, Canada

[22] Filed: Apr. 2, 1973

[21] Appl. No.: 347,190

[52] U.S. Cl. .......... 179/15 AF
[51] Int. Cl. .......... H04j 3/06
[58] Field of Search .......... 179/15 AF; 178/69.5 R

[56] References Cited

UNITED STATES PATENTS

| | | | |
|---|---|---|---|
| 3,569,631 | 3/1971 | Johannes | 179/15 AF |
| 3,575,557 | 4/1971 | McCowen | 179/15 AF |
| 3,597,552 | 8/1971 | Goto | 179/15 AF UX |
| 3,646,271 | 2/1972 | Shigaki | 179/15 AF |

*Primary Examiner*—David L. Stewart
*Attorney, Agent, or Firm*—John E. Mowle

[57] ABSTRACT

A pulse stuffing control circuit, for reducing waiting time jitter in a time division multiplex system, in which a sampling window is provided to determine the need for a stuffed pulse. The use of the window creates a higher frequency jitter component in the transmitted pulse stream which can be readily filtered out at the receiving terminal.

6 Claims, 4 Drawing Figures

PATENTED AUG 20 1974

3,830,981

SHEET 3 OF 3

PULSE STUFFING CONTROL CIRCUIT FOR REDUCING JITTER IN TDM SYSTEM

This invention relates to a control circuit for use in a time-division digital multiplex transmission system which utilizes pulse stuffing techniques, and more particularly to a pulse-stuffing control circuit which provides reduced waiting time jitter.

BACKGROUND OF THE INVENTION

In order to multiplex a number of asynchronous digital pulse streams to produce a high speed bit stream, it is necessary to provide some form of synchronization between them. This problem is discussed at length in chapter 26 of "Digital Multiplexers of 'Transmission Systems for Communications'" by Bell Telephone Laboratories, 4th edition, pp 608 et seq. U.S. Pat. No. 3,136,861 entitled "PCM Network Synchronization" by John S. Mayo, issued June 9, 1964, describes a time division transmission system which utilizes pulse stuffing techniques to achieve synchronization. As described therein, the method involves adding a sufficient number of pulses to each of the asynchronous pulse streams to raise their rates to a common higher pulse repetition rate. The various pulse streams can then be readily time-division multiplexed.

At the receiver, the multiplexed pulse stream is first demultiplexed and then destuffed by removing the added pulses. It is necessary to provide synchronization information in order to identify the location of the stuffed pulses. One such signal format for achieving this is described in chapter 26 of the above-mentioned Bell Telephone Laboratories textbook, pp 612 et seq. Because the dummy pulses can only be inserted at intervals, a waiting time jitter is introduced into the multiplexed pulse stream. In order to control this jitter, the recovered data streams are individually smoothed using elastic stores and phase-controlled oscillators which, after removal of the stuffed pulses, remove substantial portions of the jitter introduced by the stuffing process. However, when smoothing is done in this way, lower frequency components of the jitter called waiting time jitter remain. One method of still further reducing this jitter is dealt with in U.S. Pat. No. 3,420,956 entitled "Jitter Reduction in Pulse Multiplexing Systems Employing Pulse Stuffing" by John D. Heightly et al., issued Jan. 2, 1969. Here, a cancellation signal generator is employed at the receiving terminal and is driven in such a way as to provide an output signal which is the negative of the jitter component of the original signal. The negative component is then utilized to further reduce the jitter to an acceptable level. It will be appreciated however that this method involves additional circuitry and hence cost to the overall system.

SUMMARY OF THE INVENTION

It has been discovered that by modifying the stuffing process in such a way as to shift some of the low frequency energy of the waiting time jitter to a fixed higher frequency, the jitter component can be filtered and hence reduced in the receiver by a phase-controlled oscillator which has a low-pass attenuation characteristic. The frequency shift is achieved in part by periodically providing a relatively small sampling window in which to determine the need for a stuffed pulse.

Thus, in accordance with the present invention there is provided a pulse stuffing control circuit for use in a time-division multiplex transmission system, which utilizes pulse stuffing techniques to effect synchronization between a plurality of asynchronous pulse streams and a higher repetition rate pulse stream. The pulse stuffing control circuit comprises a control signal generator for controlling the periodic insertion of synchronization information, which identifies the location of stuffed pulses, in the higher repetition rate pulse stream. A stuffing signal generator, which sub-periodically compares the relative phase of one of the asynchronous pulse streams with that of the higher repetition rate pulse stream, generates a stuffing signal when the phase shift between the streams exceeds a selected threshold. In a preferred embodiment, the window interval is substantially equal to the period of the synchronization information. In addition, there is a circuit which is responsive to the control signal and the stuffing signal for deleting selected pulses from the higher repetition rate pulse stream so as to generate a stuffing controlled pulse stream having the same repetition rate as the higher repetition rate pulse stream and the same absolute pulse count as the above-mentioned asynchronous pulse stream.

BRIEF DESCRIPTION OF THE DRAWINGS

An example embodiment of the invention will now be described with reference to the accompanying drawings in which.

DESCRIPTION OF THE PREFERRED EMBODIMENT

Figure 1:
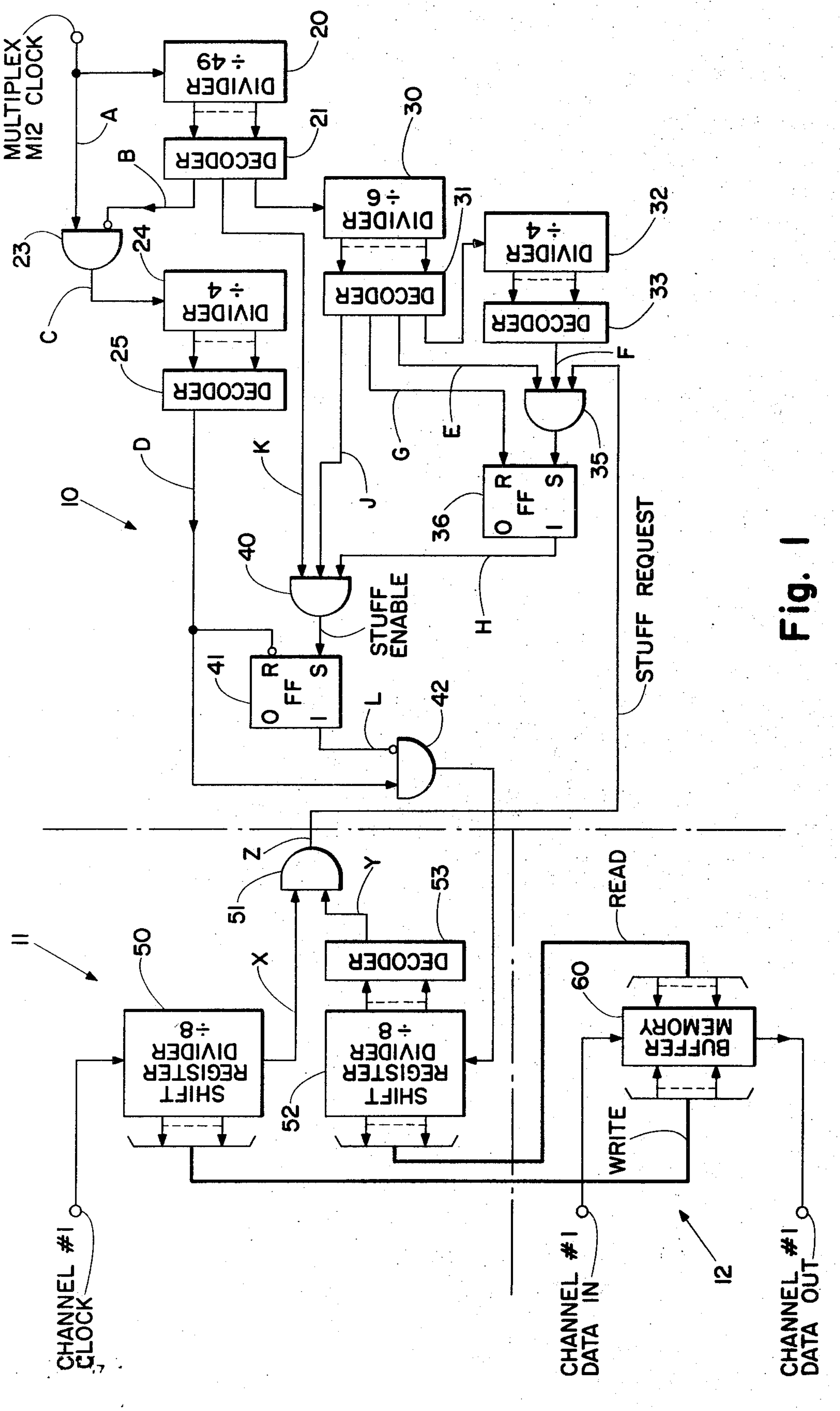
FIG. 1 illustrates a block schematic diagram of a pulse stuffing control circuit for a time-division multiplex transmission system in accordance with the present invention.

Referring to FIG. 1, the pulse stuffing control circuit is divided into two basic sections: a common control 10 and a channel No. 1 synchronizer 11. In addition, a stuffing circuit 12 which applies the read/write output of the pulse stuffing control circuit to the channel No. 1 data stream is also illustrated.

Figure 2:
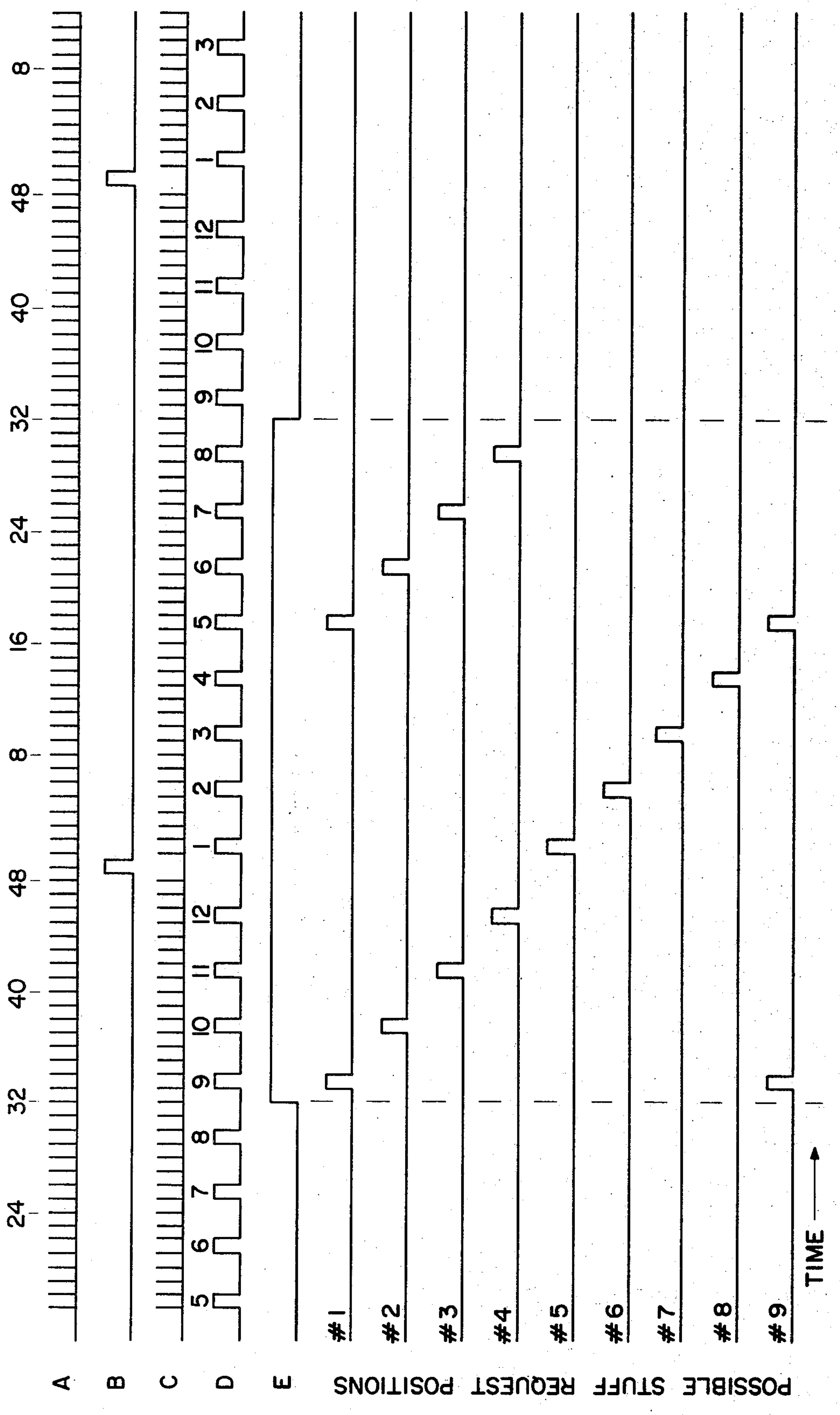
FIGS. 2, 3 and 4 illustrate various waveforms generated by or associated with the pulse stuffing control circuit illustrated in FIG. 1.
Figure 3:
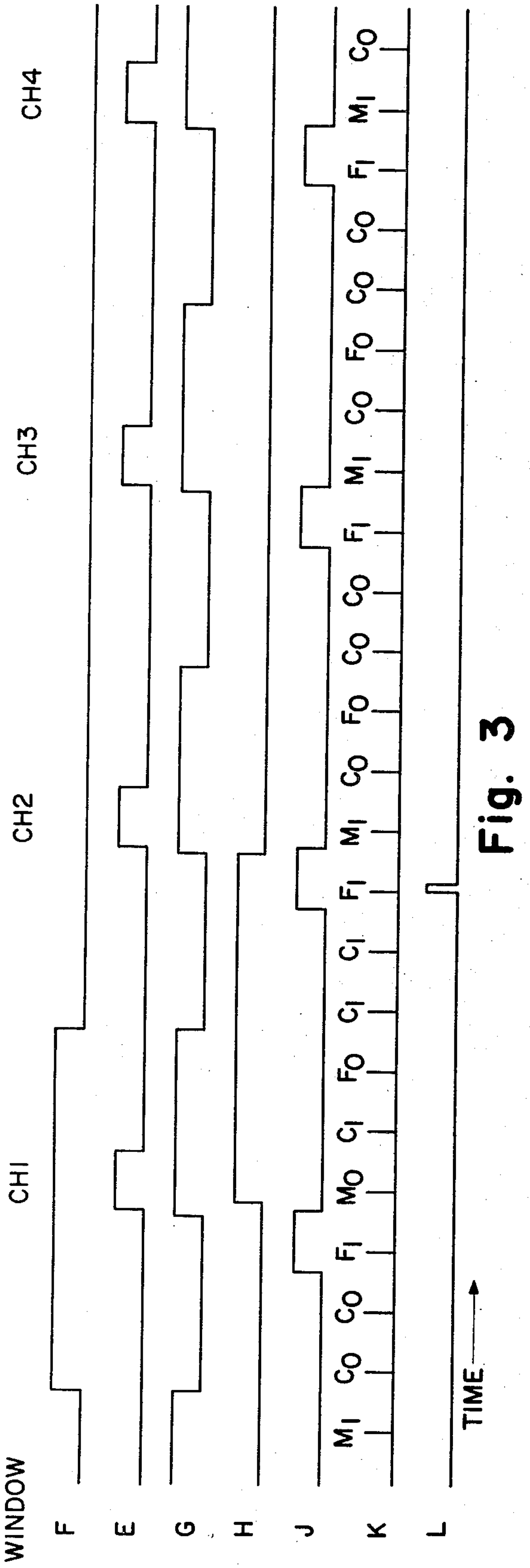
Figure 4:
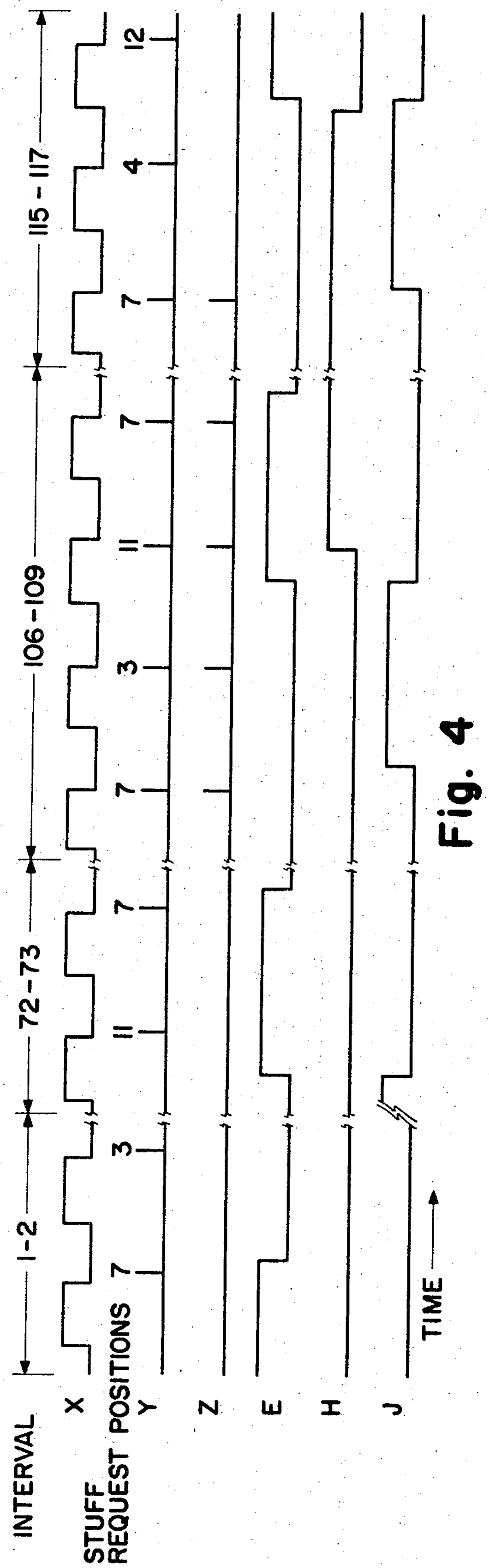

The detailed structure of the pulse stuffing control circuit of FIG. 1 will become readily apparent from the following circuit description of its function and operation when taken in conjunction with the various waveforms illustrated in FIGS. 2, 3 and 4. The signal format of this example embodiment follows closely that described in chapter 26 of the above-mentioned Bell Telephone Laboratories textbook. The basic system described therein is a 24 channel T1 carrier system operating at a digital rate of 1.544 Mb/s. Four channels of T1 carrier are multiplexed to the next hierarchy T2 system having a 6.312 Mb/s rate in a M12 multiplexer. Since all four pulse stuffing control circuits are basically the same only the one associated with channel No. 1 of the T1 system will be described in detail. It will however, be evident that the application of the principles described herein can be applied to the other three channels as well. In addition, it will be evident that the same principles can be applied in multiplexing still higher in the digital hierarchy.

In the accompanying drawings, the location of the digital waveforms illustrated in FIGS. 2, 3 and 4, are identified by corresponding reference characters in FIG. 1. It will be evident that the time scales of FIGS. 2, 3 and 4 are quite different as evidenced by the length of the pulses in waveform E which is common to all three. Positive logic is assumed so that a positive or upward going signal represents a logic 1, while a negative or downward going signal a logic 0.

Referring more specifically to FIGS. 1 and 2, a multiplex M12 clock waveform A is applied to ÷49 divider 20 the output of which is then decoded in a decoder 21. Digital output B from the decoder 21 is applied to the inverted input of an AND gate 23 which has as its other input digital waveform A. This results in digital waveform C in which every 49th pulse is removed. Removal of these pulses provides the time slot in the multiplexed signal for the insertion of network frame and channel synchronization, and channel pulse stuffing identification.

The output waveform C of the AND gate 23 is applied to a ÷4 divider 24, the output of which is then decoded in a decoder 25 to produce at its output pulse waveform D. For convenience, the pulses of waveform D have been numbered 1 to 12. Because of the removal of every 49th pulse, there is a longer time interval or phase delay between the 12th and 1st pulses. Similar waveforms (not shown) each displaced with respect to the other by one time slot, are also generated by the decoder 25, for the other three T1 channels to be multiplexed in the M12 multiplexer.

Another output from the decoder 21 is fed to a ÷6 divider 30 the output of which is decoded in a decoder 31 to produce at its output waveform E which provides the sampling window for all four channels of the stuffing control circuit. In this embodiment the time interval of window E (that is: the time that the window is open) is equal to the period of the synchronization pulses B which allows 12 possible stuff request positions, as can be seen from waveform D. Window intervals can be made smaller providing at least one stuff request position always falls in the window; window intervals can be made larger providing stuffing information can be sent out before the next channel time. The balance of the waveforms in FIG. 2 illustrate the possible stuff request positions as will be explained in detail hereinafter.

Referring more specifically to FIGS. 1 and 3, another output from the decoder 31 is fed to a ÷4 divider 32 the output of which is then decoded by a decoder 33 to produce a channel No. 1 selection waveform F. Signals E and F are fed to an AND gate 35 the output of which provides the sampling window for channel No. 1 which sets an RS flip flop 36 upon the presence of a stuff request signal. Just prior to the sampling window period the RS flip flop 36 is reset by the leading edge of waveform G which is also obtained from the decoder 31. Waveform H in FIG. 3 illustrates the output of the RS flip flop 36 being set by a stuff request signal during the channel No. 1 sampling window.

The coincidence of logic 1 outputs from decoders 21, 31 and the RS flip flop 36 as shown in waveforms H, J and K produces a stuff enable signal at the output of AND gate 40 which sets an RS Flip flop 41 to produce a pulse L. This pulse L which is fed to the inverted input of an AND gate 42 inhibits one pulse of waveform D from being coupled to the synchronizer 11. The RS flip flop 41 is reset by the trailing edge of the inhibited pulse on D, which is applied to its inverted reset input.

As shown in FIG. 3, there is a time lapse of a number of synchronization information pulses K following the setting of the RS flip flop 36, indicated by the leading edge of the pulse H, before the inhibiting signal L is applied to the AND gate 42. During this interval, channel identification and pulse stuffing synchronization information are transmitted by the pulse stream K. The signal format is the same as that described in chapter 26 of the above-described Bell Telephone Laboratories textbook in which alternate logic 1s and 0s are transmitted for the main framing digits $F_1$ and $F_0$. Following each $F_1$, the M digits identify in which of the four multiplex T1 channels the stuffing is to occur. This is achieved by sequentially transmitting the sequence logic 0, 1, 1, 1 during $M_0$, $M_1$, $M_1$, $M_1$ respectively. The three C digits following each M are transmitted as logic 0s except when a pulse stuffing is to occur in which case they are transmitted as logic 1s. Thus, in the present embodiment the three $C_1$s identify a pulse stuffing to follow in channel No. 1 immediately following the next $F_1$ pulse. A similar sequence which is not shown also applies to channels 2, 3 and 4.

Referring more specifically to the synchronizer 11 of FIG. 1, and the waveforms of FIG. 4, the input pulse stream from the channel No. 1 clock is fed to a ÷8 shift register divider 50, having an output X which is fed to one input of an AND gate 51. It will be noted that due to the expanded time scale of FIG. 4, only selected portions of the pulse waveforms have been presented. The designated intervals are with reference to the waveform X which is controlled by the channel No. 1 clock.

The output of the AND gate 42 is also fed to a ÷8 shift register divider 52, the output of which is then decoded in a decoder 53 to provide a pulse waveform Y which is fed to the other input of the AND gate 51. In this example, the initial output from the decoder 53 is alternately pulse No.'s 7, 3 and 11 which appear in waveform Y. These correspond to rows No. 3 and No. 7 of FIG. 2. However, th sampling window of waveform E occurs only during the presence of pulses 11 and 7.

Initially, assume that a pulse has just been stuffed and consequently the pulses of waveform Y will lag those shown in waveform X as indicated during interval 1–2. Because the pulse repetition rate of Y is inherently slightly faster than X, the pulses will appear slightly closer in time and consequently will eventually reach coincidence with those of X. During interval 72–73, a sampling window appears in waveform E. However, kncj42e coincidence between X and Y has not yet been reached, there is no output from the AND gate 51. Consequently no stuff request signal is generated during this window and the RS flip flop 36 remains reset as seen by waveform H. Later on, during interval 105–109, coincidence has now been reached as can be seen during pulses 7 and 3 and consequently stuff request pulses appear on waveform Z. In the prior art, this coincidence would automatically cause a stuff enable signal to be generated which would eventually result in the stuffing of an additional pulse into the pulse stream.

However, in the present invention the periodic insertion of the network frame and channel synchronization pulses of waveform K results in a phase delay between pulses 12 and 1 of waveform D. This delays the pulses of waveform Y by a small amount so that the stuff request signals of waveform Z may cease before the window interval of waveform E is reached. Consequently, no Stuff Enable signal would then be generated, and no pulse stuffing would take place. Thus, the stuff requests must continue until at least one occurs in the window interval of the waveform E before the RS flip flop 36 can be set to produce a logic 1 on waveform H.

During the interval between 109 and 115, synchronization information is transmitted as discussed earlier with reference to waveform K of FIG. 3. The coincidence of logic 1s on waveforms H, J and K produces a Stuff Enable signal which sets the RS flip flop 41 to provide an inhibiting pulse on waveform L which inserts a stuffed pulse in channel No. 1 immediately following pulse $F_1$ of waveform K. This results in a shift from pulse 3 to pulse 4 as noted in waveform Y OF FIG. 4. Thereafter, the sequence 4, 12, 8 will row be generated as indicated in waveform No. 3 and No. 4 of FIG. 2 until the next stuffing takes place whereupon it will again shift one pulse interval. Thus, waveforms No. 1 to No. 9 illustrate the sequence of pulse combinations which appear during the windows of waveforms E.

During interval 115–117, the waveform H resets just prior to the following window of the second channel. In order to provide a better understanding of the repetition rate of the various waveforms, the following is a non-limiting example of nominal clock frequencies and total pulse counts encountered in a typical M12 multiplexer:

| | | | | |
|---|---|---|---|---|
| Channel No. 1 clock | | | | ≅ 1.544 Mb/s |
| Multiplex M12 Clock | | | = A | ≅ 6.312 Mb/s |
| Synchronization Pulses | B | = K | = A/49 | ≅ 128.816 Kb/s |
| Synchronization Pulses | C | | = 48 A/49 | ≅ 6.183 Mb/s |
| Synchronization Pulses | D | | = 12A/49 | ≅ 1.546 Mb/s |
| Sampling Windows | E = | G = J | = B/6 | ≅ 21.469 Kb/s |
| Sampling Windows | F | | = E/4 | ≅ 5.367 Kb/s |
| Stuffing Signal | L = | (D-No. 1 clock) | | ≅ 1.796 Kb/s |
| Synchronization Pulses | X | = Y | = No. 1 clock/8 | ≅ 193 Kb/s |

The shift register divider 50 also generates a WRITE signal which clocks the data bit stream for channel No. 1 into a buffer memory 60 of the stuffing circuit 12 under control of the channel No. 1 clock. The bit stream is read out from the memory 60 under control of a READ signal which is derived from the shift register divider 52. It will be evident that the repetition rate of the READ signal is greater than that of the WRITE signal. However due to the periodic phase delays (between pulses 12 and 1 of waveform D) and the systematic blocking of the AND gate 42 by the inhibiting pulse L resulting from a Stuff Enable signal, the total pulse count is the same as that of the channel No. 1 clock.

Referring again to FIG. 2, between waveforms No. 4 and No. 5 two differences are to be noted: the time between pulses 12 and 1 is greater than the time between any other adjacent pulses; and waveform No. 5 has only one stuff request position rather than two. The result of this is a delay between the time a stuff request could occur if it were not for the delay introduced by the frame synchronization pulses. By utilizing the sampling window in the common control 10, and the ÷8 arrangement in the synchronizer 11, a delayed stuff will result which increases the waiting time jitter. However, between waveforms No. 8 and No. 9, the stuffing will again advance. Hence, there is a periodic advance and delay in pulse stuffing which results in an increase and decrease in waiting time jitter. Due to the dividers 50 and 52, this component of waiting time jitter is at ⅛ the stuffing frequency. In the above example, the nominal stuffing rate is 1,796 Hz; ⅛ of which is about 225 Hz. Therefore, a phase-controller oscillator in the receiver (not shown) with a cut-off frequency below 225 Hz attenuates this component to provide a lower level of jitter at its output.

What is claimed is:

1. In a time-division multiplex transmission system, utilizing pulse stuffing techniques to effect synchronization between a plurality of asynchronous pulse streams and a higher repetition rate pulse stream;

a pulse stuffing control circuit comprising:

means for generating a control signal, for controlling the periodic insertion of synchronization information, which identifies the location of stuffed pulses, in the higher repetition rate pulse stream;

means for comparing during regularly periodic window intervals the relative phase of one of the asynchronous pulse streams with that of the higher repetition rate pulse stream for generating a stuffing signal in response to the phase shift therebetween exceeding a selected threshold, and means responsive to said control signal and said stuffing signal to delete selected pulses from said higher repetition rate pulse stream to generate a stuffing controlled pulse stream having the same repetition rate as the higher repetition rate pulse stream and the same pulse count as said one asynchronous pulse stream.

2. A pulse stuffing control circuit as defined in claim 1 in which the comparison interval is substantially equal to that of said synchronization information.

3. A pulse stuffing control circuit as defined in claim 2 in which said phase shift has a time interval substantially equal to the period of the multiplexed pulse stream.

4. In a time-division multiplex transmission system, utilizing pulse stuffing techniques to effect synchronization between a plurality of pulse streams and a higher repetition rate pulse stream;

a pulse stuffing control circuit comprising:

means responsive to a multiplex control clock for generating a control pulse stream at a fraction of said clock repetition rate, said control pulse stream having periodic phase delays equal to one multiplex control clock interval for inserting synchronization information pulses or spaces, which identify the location of stuffed pulses, in the higher repetition rate pulse stream;

means for comparing, during regularly periodic window intervals, the relative phase shift of one of said plurality of pulse streams with that of said control pulse stream to generate a stuffing signal when said phase shift exceeds that between adjacent pulses, the comparison interval being substantially equal to that between two adjacent phase delays; and means responsive to the stuffing signal for blocking a pulse in said control pulse stream so as to generate a stuffing controlled pulse stream having the same pulse count as that of said one pulse stream and the same repetition rate as that of said higher repetition rate pulse stream.

5. In a time-division multiplex transmission system, utilizing pulse stuffing techniques to effect synchronization between a plurality of asynchronous pulse streams and a higher repetition rate pulse stream;

a pulse stuffing control circuit comprising:

phase comparison means for periodically determining, during a fixed predetermined portion of the total available time, the need for stuffed pulses in one of said plurality of asynchronous pulse streams; and means responsive to said phase comparison means for controlling the insertion of said stuffed pulses in said one asynchronous pulse stream.

6. In a time-division multiplex transmission system, utilizing pulse stuffing techniques to effect synchronization between a plurality of asynchronous pulse streams and a higher repetition rate pulse stream;

a pulse stuffing control circuit comprising:

means for comparing during regularly periodic window intervals the relative phase of one of the asynchronous pulse streams with that of the higher repetition rate pulse stream for generating a stuffing signal in response to the phase shift therebetween exceeding a selected threshold; and means responsive to said stuffing signal to delete selected pulses from said higher repetition rate pulse streams to generate a stuffing control pulse stream having the same repetition rate as the higher repetition rate pulse stream and the same pulse count as said one asynchronous pulse stream.

* * * * *